US011800507B2

(12) United States Patent
Pezeshki et al.

(10) Patent No.: US 11,800,507 B2
(45) Date of Patent: Oct. 24, 2023

(54) UE FEEDBACK FOR BEAM COMBINATIONS FOR TRANSMISSION RECEPTION POINTS

(71) Applicant: QUALCOMM Incorporated, San Diego, CA (US)

(72) Inventors: Hamed Pezeshki, San Diego, CA (US); Yan Zhou, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 10 days.

(21) Appl. No.: 16/837,871

(22) Filed: Apr. 1, 2020

(65) Prior Publication Data
US 2020/0322940 A1    Oct. 8, 2020

Related U.S. Application Data

(60) Provisional application No. 62/828,842, filed on Apr. 3, 2019.

(51) Int. Cl.
*H04W 72/044* (2023.01)
*H04L 5/00* (2006.01)
(Continued)

(52) U.S. Cl.
CPC ........ *H04W 72/046* (2013.01); *H04B 7/0626* (2013.01); *H04L 5/0051* (2013.01); *H04W 24/10* (2013.01)

(58) Field of Classification Search
CPC .. H04W 72/046; H04W 24/10; H04B 7/0626; H04L 5/0051
See application file for complete search history.

(56) References Cited

U.S. PATENT DOCUMENTS

2005/0197162 A1\*   9/2005  Fujishima ............ H04B 7/0408
                                                          455/562.1
2016/0381569 A1\*  12/2016  Wang .................... H04W 16/28
                                                             370/338
(Continued)

FOREIGN PATENT DOCUMENTS

CA            3041553 A1 \*  5/2018  .......... H04B 17/318
WO      WO-2018062937 A1     4/2018
(Continued)

OTHER PUBLICATIONS

International Search Report and Written Opinion—PCT/US2020/026416—ISA/EPO—dated Apr. 12, 2021.
(Continued)

*Primary Examiner* — Deepa Belur
(74) *Attorney, Agent, or Firm* — Kristine U. Ekwueme

(57) ABSTRACT

Certain aspects of the present disclosure provide techniques for user equipment (UE) feedback for beam combinations. An exemplary method generally includes determining at least a first beam combination for at least a first transmission
(Continued)

reception point (TRP) and a second TRP, transmitting an indication of the first beam combination to at least one of the first TRP or the second TRP, receiving, based on the indication, configuration information indicating a second beam combination, and communicating with at least the first TRP and the second TRP based on the second beam combination.

28 Claims, 16 Drawing Sheets

(51) Int. Cl.
*H04B 7/06* (2006.01)
*H04W 24/10* (2009.01)

(56) References Cited

U.S. PATENT DOCUMENTS

| | | | |
|---|---|---|---|
| 2018/0041936 A1* | 2/2018 | Kim | H04W 72/085 |
| 2020/0028547 A1* | 1/2020 | Gao | H04B 7/0417 |
| 2020/0280377 A1* | 9/2020 | Haustein | H04B 17/104 |
| 2020/0373988 A1* | 11/2020 | Wang | H04L 1/06 |
| 2020/0374960 A1* | 11/2020 | Deenoo | H04W 72/14 |
| 2021/0084655 A1* | 3/2021 | Estevez | H04W 74/0833 |

FOREIGN PATENT DOCUMENTS

| | | | | |
|---|---|---|---|---|
| WO | WO-2018171662 A1 * | 9/2018 | | H04B 7/0456 |
| WO | WO-2019157230 A1 * | 8/2019 | | H04B 7/024 |
| WO | WO-2020164027 A1 * | 8/2020 | | H04W 36/00 |
| WO | WO-2022155514 A1 * | 7/2022 | | |

OTHER PUBLICATIONS

International Search Report and Written Opinion—PCT/US2020/026416—ISA/EPO—dated Jun. 25, 2020.

Mediatek Inc: "Beam Indication with Low Overhead Consideration", 3GPP TSG RAN WG1 Meeting #90, 3GPP Draft, R1-1714562, Beam Indication Revised Final, 3rd Generation Partnership Project (3GPP), Mobile Competence Centre, 650, Route Des Lucioles, F-06921 Sophia-Antipolis Cedex, France, vol. RAN WG1, No. Prague, Czech, Aug. 21, 2017-Aug. 25, 2017, Aug. 20, 2017 (Aug. 20, 2017), 4 Pages, XP051317332, Retrieved from the Internet: URL: http://www.3gpp.org/ftp/Meetings_3GPP_SYNC/RAN1/Docs/. [retrieved on Aug. 20, 2017] Section 2, figure 1.

Samsung: "Discussion on Tx Beam Grouping Configuration for Multi-Panel TRP and Multi-TRP", 3GPP Draft, 3GPP TSG RAN WG1 Meeting #90bis, R1-1717610, 3rd Generation Partnership Project (3GPP), Mobile Competence Centre, 650, Route Des Lucioles, F-06921 Sophia-Antipolis Cedex, France, vol. RAN WG1, No. Prague, Czech, Oct. 9, 2017-Oct. 13, 2017, Oct. 8, 2017 (Oct. 8, 2017), XP051340796, 6 Pages, Retrieved from the Internet: URL: http://www.3gpp.org/ftp/Meetings_3GPP_SYNC/RAN1/Docs/ [Retrieved on Oct. 8, 2017], The Whole Document.

* cited by examiner

UE FEEDBACK FOR BEAM COMBINATIONS FOR TRANSMISSION RECEPTION POINTS

CROSS-REFERENCE TO RELATED APPLICATIONS

This application claims benefit of and priority to U.S. Provisional Application No. 62/828,842, filed Apr. 3, 2019, which is hereby assigned to the assignee hereof and hereby expressly incorporated by reference herein in their entireties as if fully set forth below and for all applicable purposes.

FIELD OF THE DISCLOSURE

Aspects of the present disclosure relate to wireless communications, and more particularly, to techniques for user equipment (UE) feedback for beam combinations for transmission reception points (TRPs).

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment. The method generally includes determining at least a first beam combination for at least a first transmission reception point (TRP) and a second TRP, transmitting an indication of the first beam combination to at least one of the first TRP or the second TRP, receiving, based on the indication, configuration information indicating a second beam combination, and communicating with at least the first TRP and the second TRP based on the second beam combination.

Certain aspects provide an apparatus for wireless communication by a user equipment. The apparatus generally includes at least one processor configured to determine at least a first beam combination for at least a first transmission reception point (TRP) and a second TRP, transmit an indication of the first beam combination to at least one of the first TRP or the second TRP, receive, based on the indication, configuration information indicating a second beam combination, and communicate with at least the first TRP and the second TRP based on the second beam combination. The apparatus also generally includes a memory coupled with the at least one processor.

Certain aspects provide an apparatus for wireless communication by a user equipment. The apparatus generally includes means for determining at least a first beam combination for at least a first transmission reception point (TRP) and a second TRP, means for transmitting an indication of the first beam combination to at least one of the first TRP or the second TRP, means for receiving, based on the indication, configuration information indicating a second beam combination, and means for communicating with at least the first TRP and the second TRP based on the second beam combination.

Certain aspects provide a non-transitory computer readable medium for wireless communication by a user equipment. The non-transitory computer readable medium generally includes instructions that, when executed by at least one processor, cause the at least one processor to determine at least a first beam combination for at least a first transmission reception point (TRP) and a second TRP, transmit an indication of the first beam combination to at least one of the first TRP or the second TRP, receive, based on the indication, configuration information indicating a second beam combination, and communicate with at least the first TRP and the second TRP based on the second beam combination.

Certain aspects provide a method for wireless communication by a base station (BS). The method generally includes receiving an indication of a first beam combination from a user equipment (UE), determining, based on the received indication, a second beam combination for the UE to use to communicate, and transmitting configuration information indicating the second beam combination to the UE.

Certain aspects provide an apparatus for wireless communication by a base station (BS). The apparatus generally includes at least one processor configured to receive an indication of a first beam combination from a user equipment (UE), determine, based on the received indication, a second beam combination for the UE to use to communicate, and transmit configuration information indicating the second beam combination to the UE. The apparatus also generally includes a memory coupled with the at least one processor.

Certain aspects provide an apparatus for wireless communication by a base station (BS). The apparatus generally includes means for receiving an indication of a first beam combination from a user equipment (UE), means for determining, based on the received indication, a second beam combination for the UE to use to communicate, and means for transmitting configuration information indicating the second beam combination to the UE.

Certain aspects provide a non-transitory computer readable medium for wireless communication by a base station (BS). The non-transitory computer readable medium generally includes instructions that, when executed by at least one processor, cause the at least one processor to receive an indication of a first beam combination from a user equipment (UE), determine, based on the received indication, a second beam combination for the UE to use to communicate, and transmit configuration information indicating the second beam combination to the UE.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
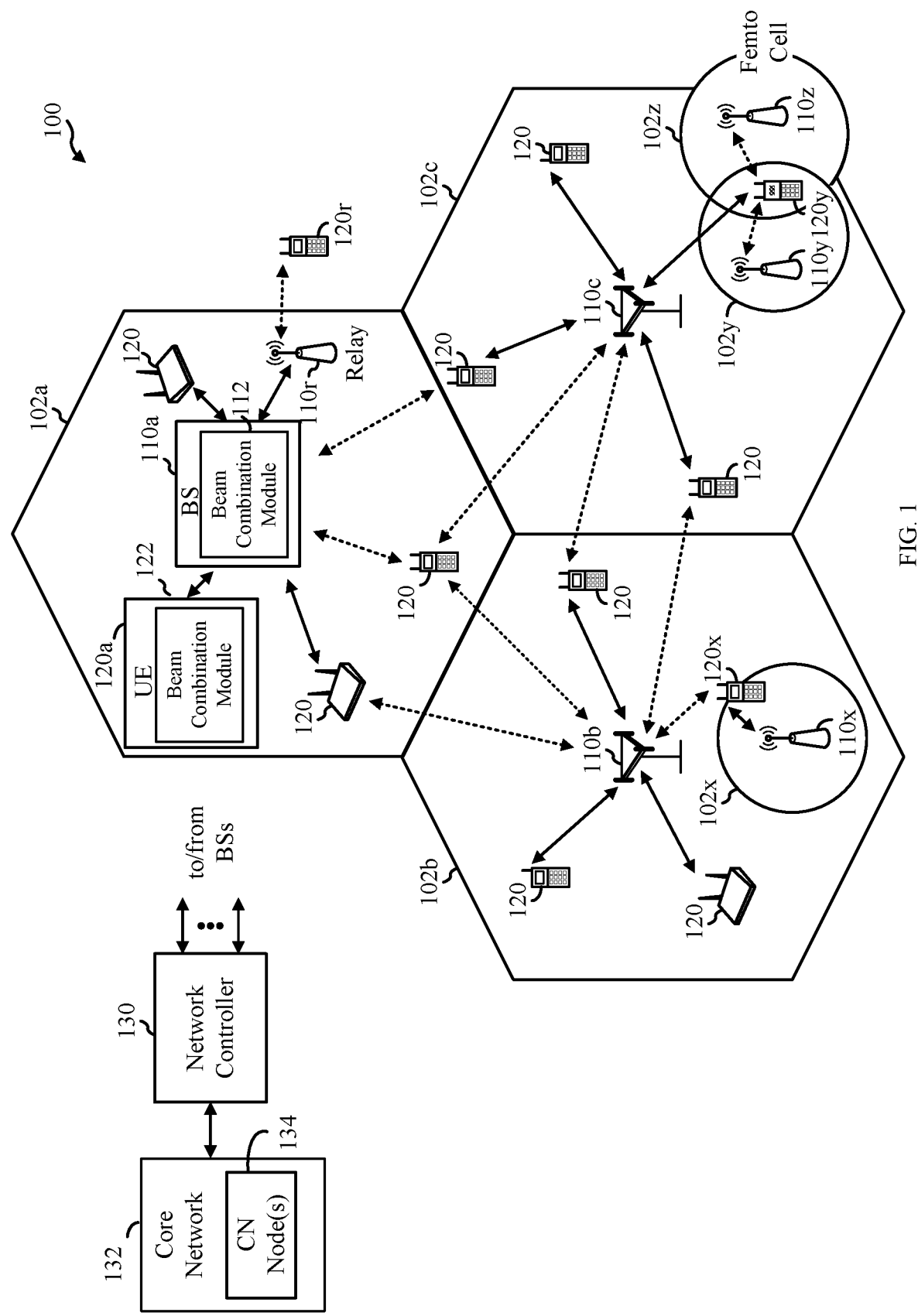
FIG. 1 is a block diagram conceptually illustrating an example telecommunications system, in accordance with certain aspects of the present disclosure.

Aspects of the present disclosure provide apparatus, methods, processing systems, and computer readable mediums for user equipment (UE) feedback for beam combinations. For example, in some cases, the UE communicate with a plurality of transmission reception points (TRPs), such as a first TRP and a second TRP. The UE may measure one or more reference signals from first TRP and the second TRP and determine a beam combination to use for communicating with the first TRP and second TRP. In some cases, the UE may provide an indication of the beam combination to a base station (e.g., associated with one of the first TRP or second TRP). By providing the base station with an indication of a beam combination, the base station may configure the UE with a set of beams for communicating with the first TRP and the second TRP that do not interfere with each other, allowing for improved quality of communication and power savings at the UE.

The following description provides examples of UE feedback for beam combinations in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable.

In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for UE feedback of beam combinations, as described herein. As shown in FIG. 1, the BS 110a includes a beam combination module 112. The beam combination module 112 may be configured to perform the operations illustrated in one or more of FIGS. 9B, 12, and 13, as well as other operations disclosed herein for UE feedback of beam combinations, in accordance with aspects of the present disclosure. As shown in FIG. 1, the UE 120a may include a beam combination module 122. The beam combination module 122 may be configured to perform the operations illustrated in one or more of FIGS. 9A, 12, and 13, as well as other operations disclosed herein for UE feedback of beam combinations.

Figure 2:
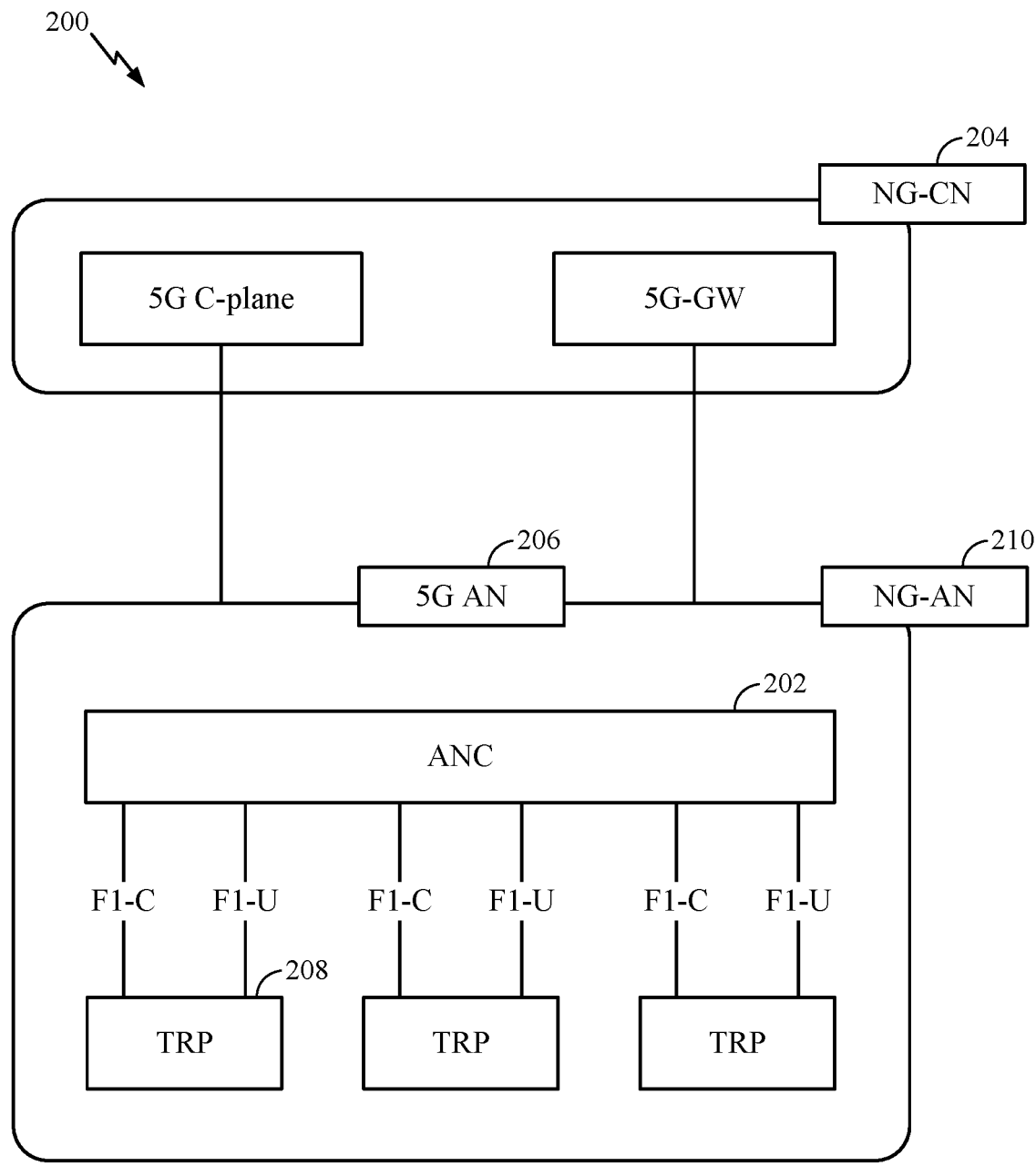
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
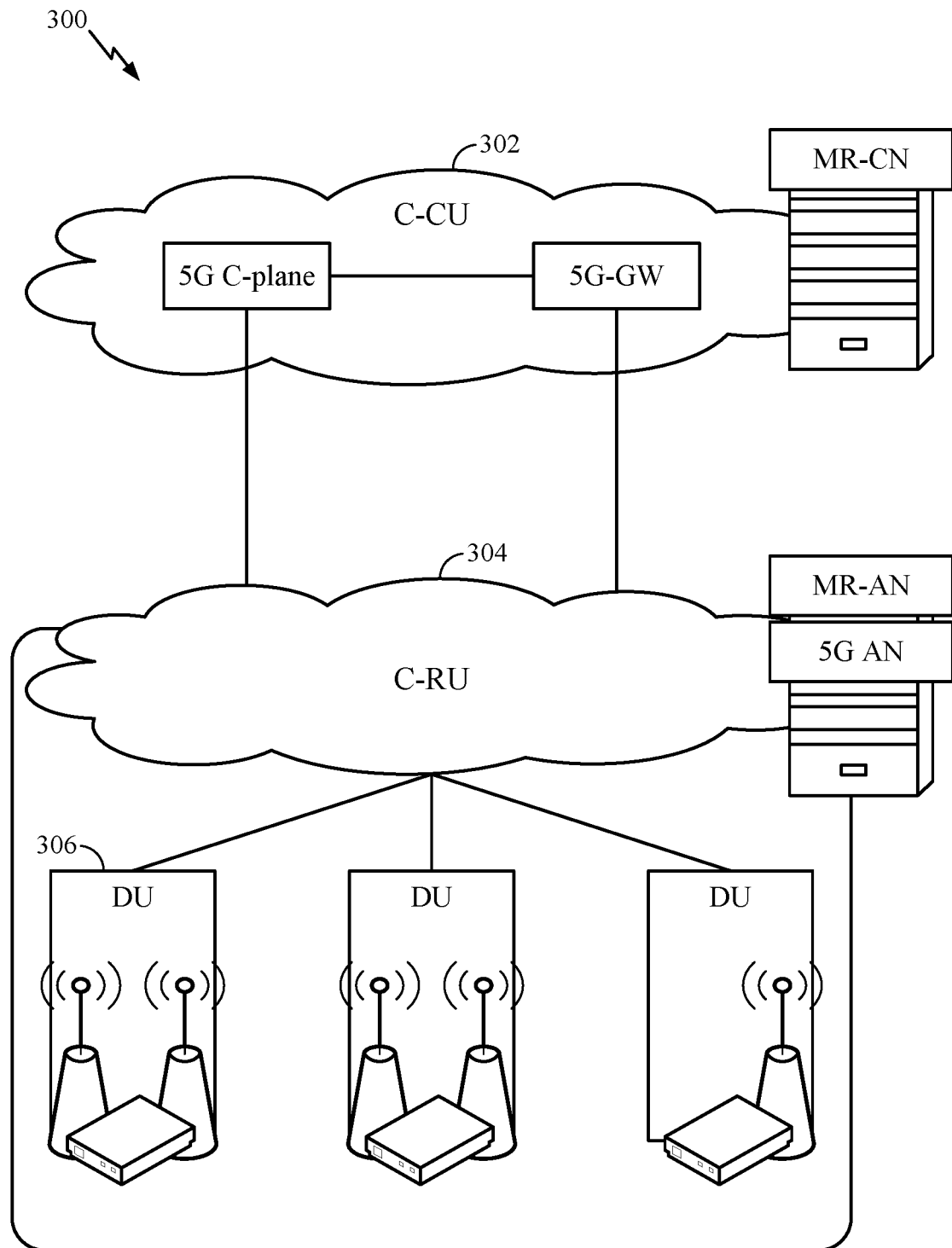
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
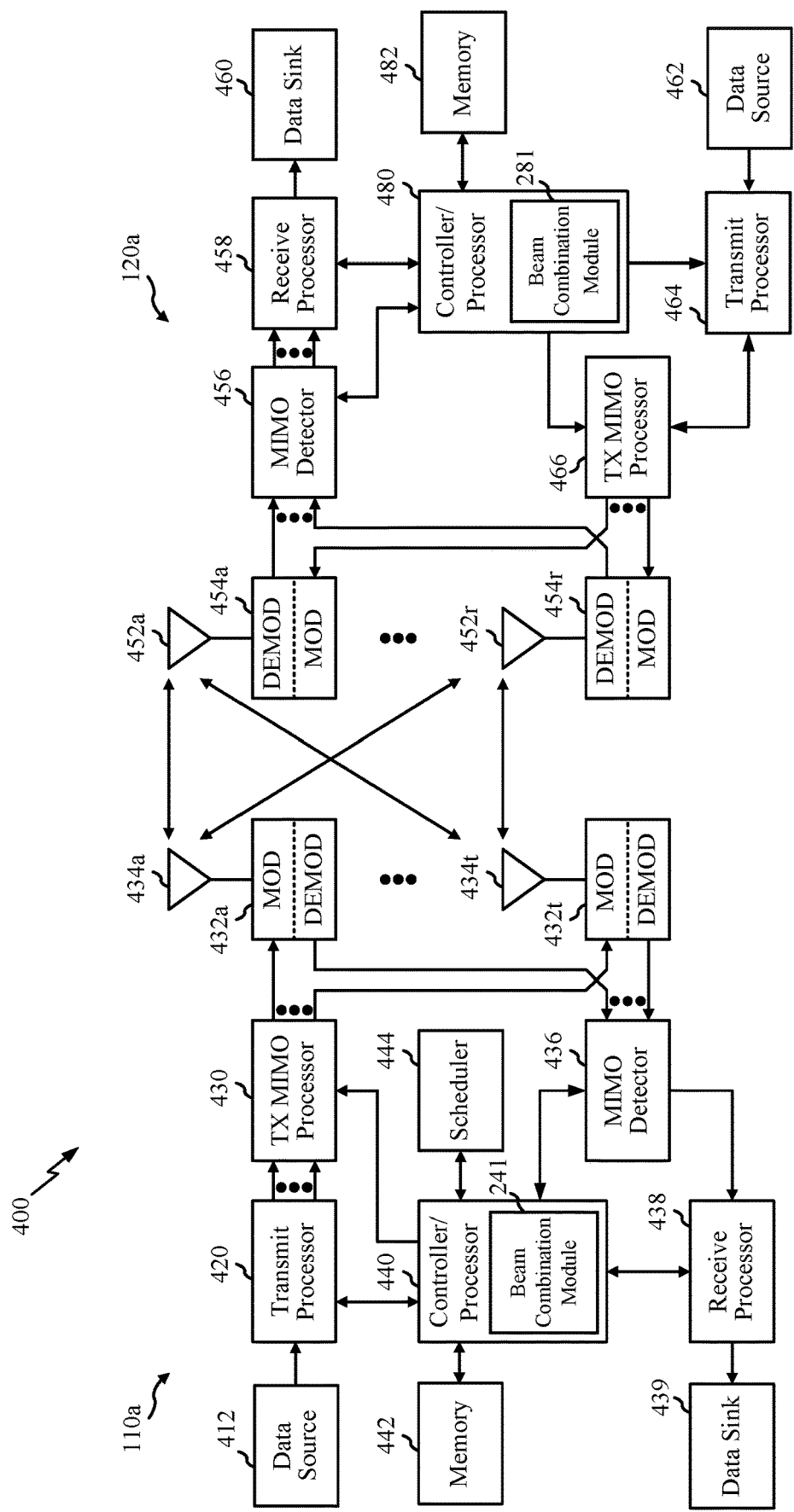
FIG. 4 is a block diagram conceptually illustrating a design of an example base station (BS) and user equipment (UE), in accordance with certain aspects of the present disclosure.

FIG. 4 illustrates example components of BS 110a and UE 120a (e.g., in the wireless communication network 100 of FIG. 1), which may be used to implement aspects of the present disclosure.

At the BS 110a, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 420 may process (e.g., encode and symbol map) the data and control information to obtain data symbols and control symbols, respectively. The transmit processor 420 may also generate reference symbols, such as for the primary synchronization signal (PSS), secondary synchronization signal (SSS), and channel state information reference signal (CSI-RS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) in transceivers 432a-432t. Each modulator in transceivers 432a-432t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 432a-432t may be transmitted via the antennas 434a-434t, respectively.

At the UE 120a, the antennas 452a-452r may receive the downlink signals from the BS 110a and may provide received signals to the demodulators (DEMODs) in transceivers 454a-454r, respectively. Each demodulator in transceivers 454a-454r may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a-454r, perform MIMO detection on the received symbols if applicable, and provide detected symbols. A receive processor 458 may process (e.g., demodulate, deinterleave, and decode) the detected symbols, provide decoded data for the UE 120a to a data sink 460, and provide decoded control information to a controller/processor 480.

On the uplink, at UE 120a, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the modulators in transceivers 454a-454r (e.g., for SC-FDM, etc.), and transmitted to the BS 110a. At the BS 110a, the uplink signals from the UE 120a may be received by the antennas 434, processed by the modulators in transceivers 432a-432t, detected by a MIMO detector 436 if applicable, and further processed by a receive processor 438 to obtain decoded data and control information sent by the UE 120a. The receive processor 438 may provide the decoded data to a data sink 439 and the decoded control information to the controller/processor 440.

The memories 442 and 482 may store data and program codes for BS 110a and UE 120a, respectively. A scheduler 444 may schedule UEs for data transmission on the downlink and/or uplink.

Antennas 452, processors 466, 458, 464, and/or controller/processor 480 of the UE 120a and/or antennas 434, processors 420, 430, 438, and/or controller/processor 440 of the BS 110a may be used to perform the various techniques and methods described herein. For example, as shown in FIG. 4, the controller/processor 440 of the BS 110a includes a beam combination module 441 that may be configured to perform the operations illustrated in one or more of FIGS. 9B, 12, and 13, as well as other operations disclosed herein for UE feedback of beam combinations, in accordance with aspects of the present disclosure. As shown in FIG. 4, the controller/processor 480 of the UE 120a includes a beam combination module 481 that may be configured for to perform the operations illustrated in one or more of FIGS. 9A, 12, and 13, as well as other operations disclosed herein for UE feedback of beam combinations, in accordance with aspects of the present disclosure. Although shown at the controller/processor, other components of the UE 120a and BS 110a may be used to perform the operations described herein.

Figure 5:
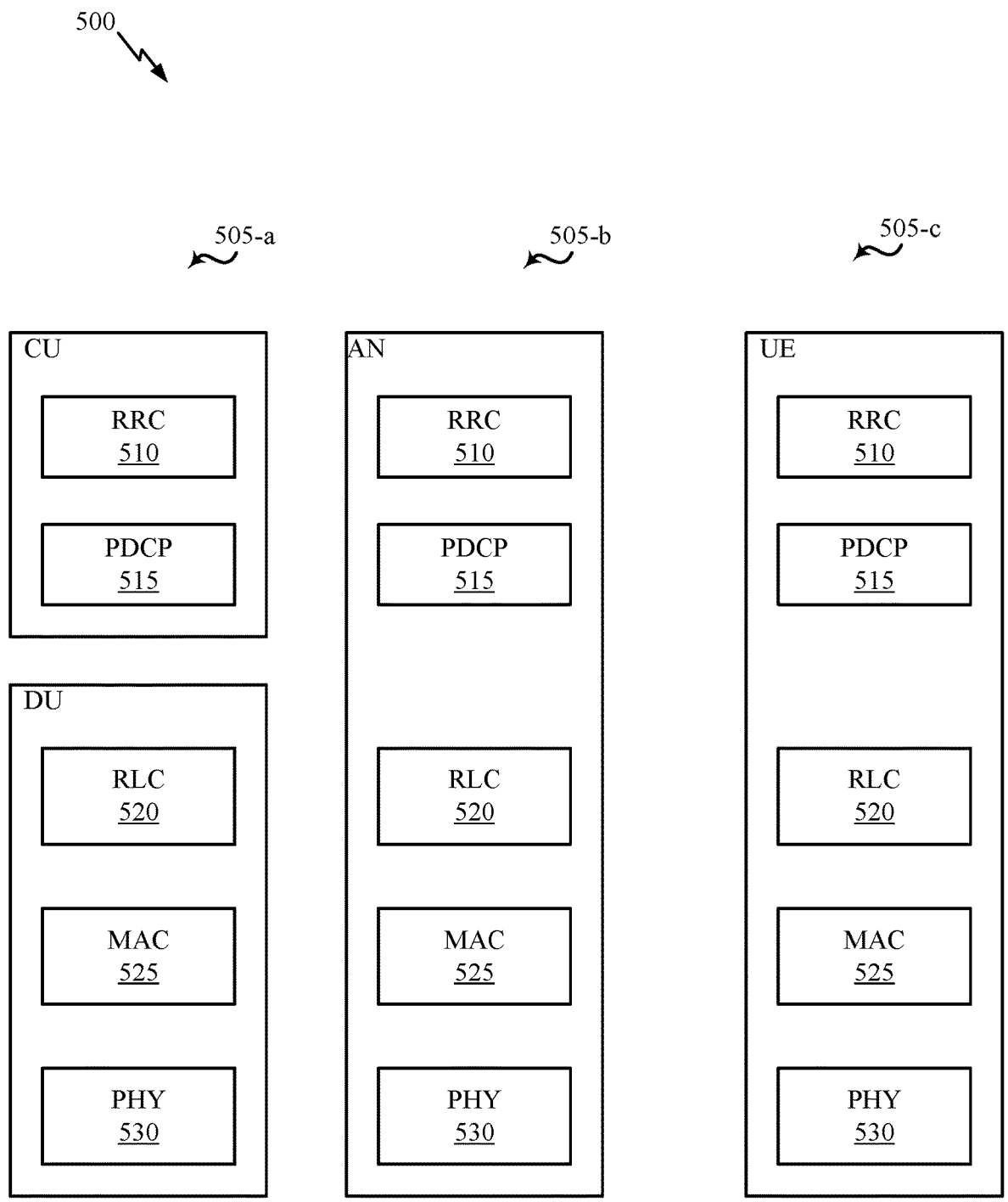
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
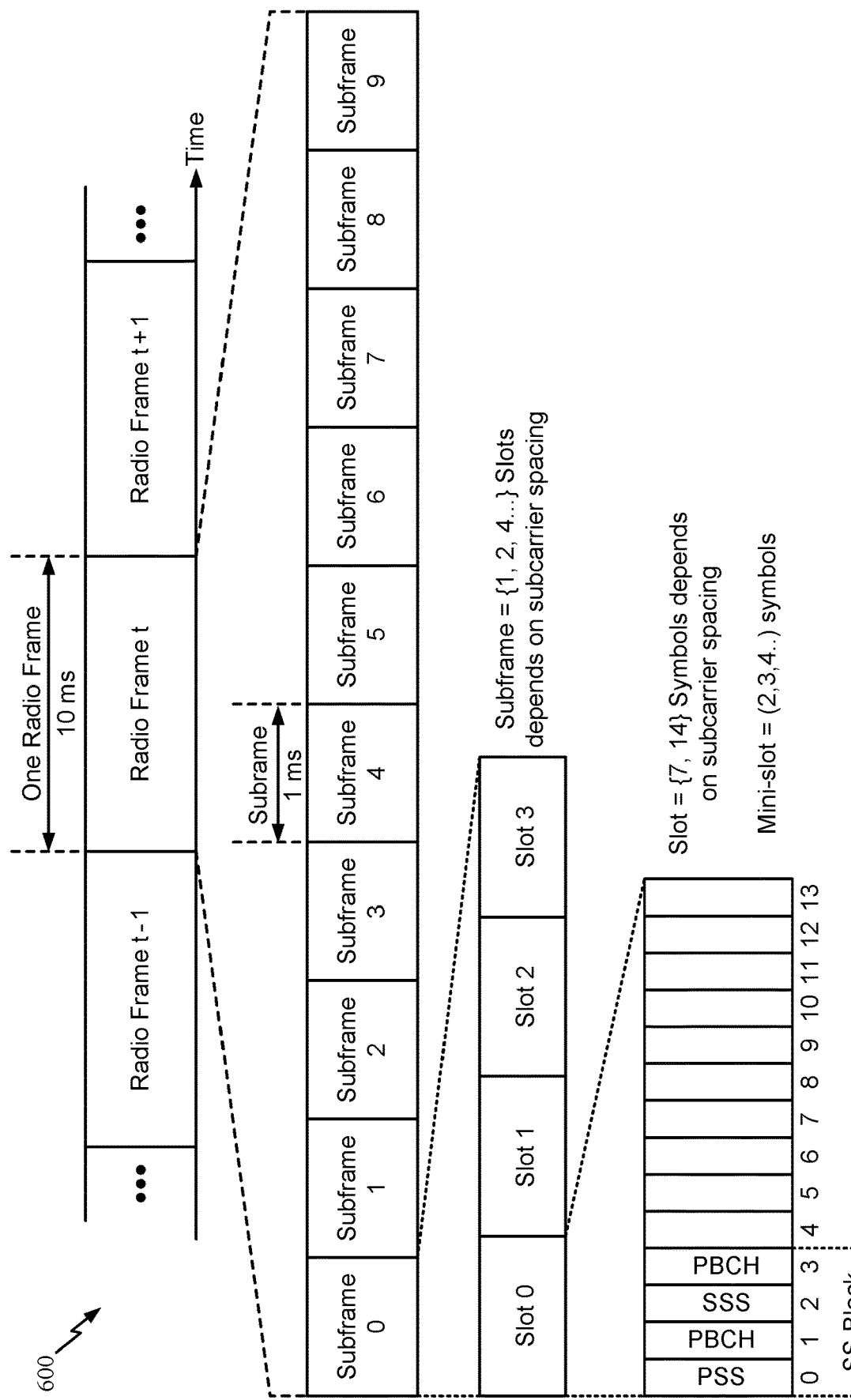
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block may be transmitted up to sixty-four times, for example, with up to sixty-four different beam directions for mmW. The up to sixty-four transmissions of the SS block are referred to as the SS burst set.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Beam Refinement Procedure

As noted above, in certain multi-beam systems (e.g., millimeter wave (mmW) cellular systems), beam forming may be needed to overcome high path-losses. As described herein, beamforming may refer to establishing a link between a BS and UE, wherein both of the devices form a beam corresponding to each other. Both the BS and the UE find at least one adequate beam to form a communication link. BS-beam and UE-beam form what is known as a beam pair link (BPL). As an example, on the DL, a BS may use a transmit beam and a UE may use a receive beam corresponding to the transmit beam to receive the transmission. The combination of a transmit beam and corresponding receive beam may be a BPL.

As a part of beam management, beams which are used by BS and UE have to be refined from time to time because of changing channel conditions, for example, due to movement of the UE or other objects. Additionally, the performance of a BPL may be subject to fading due to Doppler spread. Because of changing channel conditions over time, the BPL should be periodically updated or refined. Accordingly, it may be beneficial if the BS and the UE monitor beams and new BPLs.

At least one BPL has to be established for network access. As described above, new BPLs may need to be discovered later for different purposes. The network may decide to use different BPLs for different channels, or for communicating with different BSs (TRPS) or as fallback BPLs in case an existing BPL fails.

The UE typically monitors the quality of a BPL and the network may refine a BPL from time to time.

Figure 7:
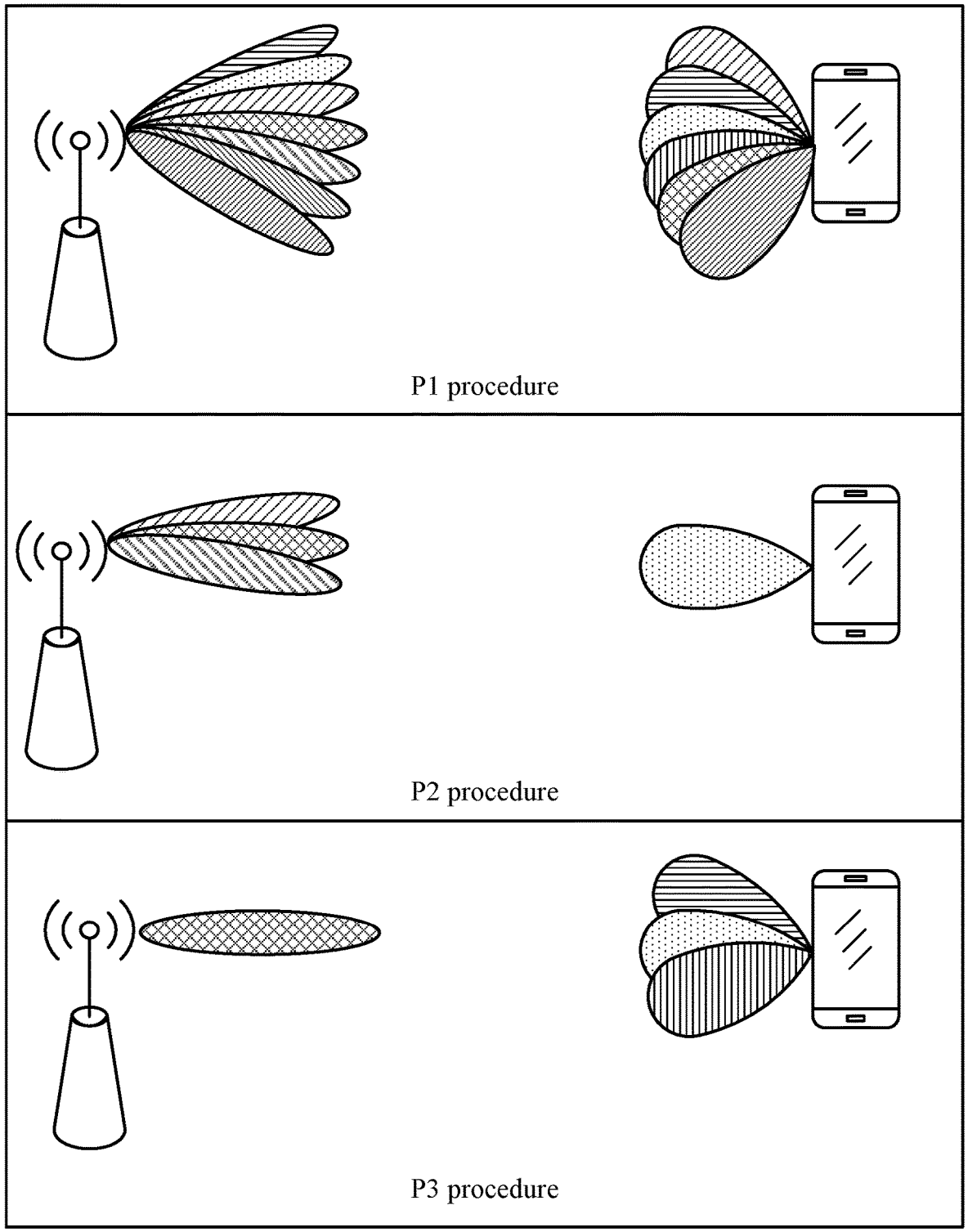
FIG. 7 illustrates example beam refinement procedures, in accordance with certain aspects of the present disclosure.

FIG. 7 illustrates example 700 for BPL discovery and refinement. In 5G-NR, the P1, P2, and P3 procedures are used for BPL discovery and refinement. The network uses a P1 procedure to enable the discovery of new BPLs. In the P1 procedure, as illustrated in FIG. 7, the BS transmits reference signals (e.g., in some cases channel state information reference signals (CSI-RS)), where each of the reference signals are beam formed in a different spatial direction such that several (most, all) relevant places of the cell are reached. Stated otherwise, the BS transmits reference signals using different transmit beams over time and in different directions.

For successful reception of at least a symbol of this "P1-signal", the UE has to find an appropriate receive beam. It searches using available receive beams and applying a different UE-beam during each occurrence of the periodic or aperiodic P1-signal.

Once the UE has succeeded in receiving a symbol of the P1-signal it has discovered a BPL. The UE may not want to wait until it has found the best UE receive beam, since this may delay further actions. The UE may measure the reference signal receive power (RSRP) and report the symbol index together with the RSRP to the BS. Such a report will typically contain the findings of one or more BPLs.

In an example, the UE may determine a received signal having a high RSRP. The UE may not know which beam the BS used to transmit; however, the UE may report to the BS the time at which it observed the signal having a high RSRP. The BS may receive this report and may determine which BS beam the BS used at the given time.

The BS may then offer P2 and P3 procedures to refine an individual BPL. The P2 procedure refines the BS-beam of a BPL. The BS may transmit a few symbols of a reference signal with different BS-beams that are spatially close to the BS-beam of the BPL (the BS performs a sweep using neighboring beams around the selected beam). In P2, the UE keeps its beam constant. Thus, while the UE uses the same beam as in the BPL (as illustrated in P2 procedure in FIG. 7). The BS-beams used for P2 may be different from those for P1 in that they may be spaced closer together or they may be more focused. The UE may measure the RSRP for the various BS-beams and indicate the best one to the BS.

The P3 procedure refines the UE-beam of a BPL (see P3 procedure in FIG. 7). While the BS-beam stays constant, the UE scans using different receive beams (the UE performs a sweep using neighboring beams). The UE may measure the RSRP of each beam and identify the best UE-beam. Afterwards, the UE may use the best UE-beam for the BPL and report the RSRP to the BS.

Over time, the BS and UE establish several BPLs. When the BS transmits a certain channel or signal, it lets the UE know which BPL will be involved, such that the UE may tune in the direction of the correct UE receive beam before the signal starts. In this manner, every sample of that signal or channel may be received by the UE using the correct receive beam. In an example, the BS may indicate for a scheduled signal (SRS, CSI-RS) or channel (PDSCH, PDCCH, PUSCH, PUCCH) which BPL is involved. In NR this information is called QCL indication.

Two antenna ports are QCL if properties of the channel over which a symbol on one antenna port is conveyed may be inferred from the channel over which a symbol on the other antenna port is conveyed. QCL supports, at least, beam management functionality, frequency/timing offset estimation functionality, and RRM management functionality.

The BS may use a BPL which the UE has received in the past. The transmit beam for the signal to be transmitted and the previously-received signal both point in a same direction or are QCL. The QCL indication may be needed by the UE (in advance of signal to be received) such that the UE may use a correct receive beam for each signal or channel. Some QCL indications may be needed from time to time when the BPL for a signal or channel changes and some QCL indications are needed for each scheduled instance. The QCL indication may be transmitted in the downlink control information (DCI) which may be part of the PDCCH channel. Because DCI is needed to control the information, it may be desirable that the number of bits needed to indicate the QCL is not too big. The QCL may be transmitted in a medium access control-control element (MAC-CE) or radio resource control (RRC) message.

According to one example, whenever the UE reports a BS beam that it has received with sufficient RSRP, and the BS decides to use this BPL in the future, the BS assigns it a BPL tag. Accordingly, two BPLs having different BS beams may be associated with different BPL tags. BPLs that are based on the same BS beams may be associated with the same BPL tag. Thus, according to this example, the tag is a function of the BS beam of the BPL.

Example UE Feedback for Beam Combinations

Figure 8A:
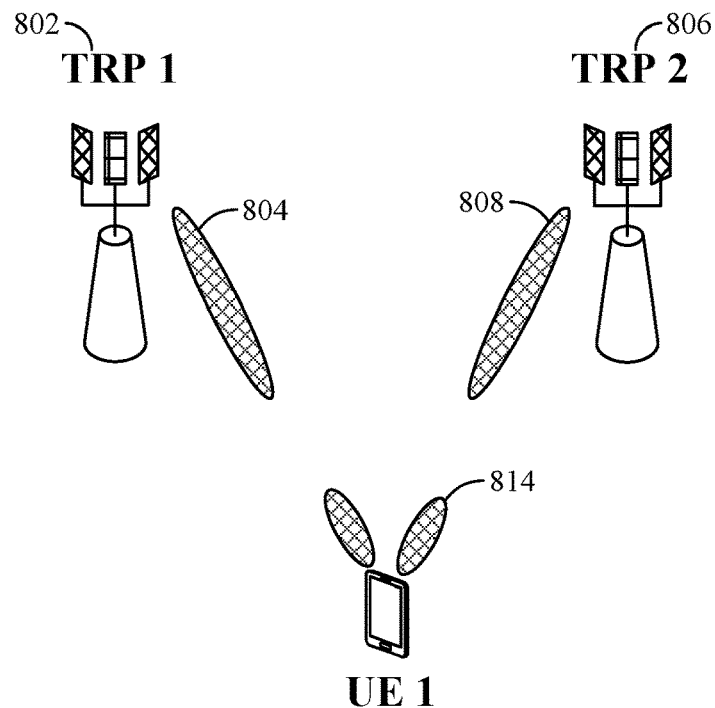
FIG. 8A illustrates an exemplary scenario of a first transmission reception point not detecting a second transmission reception point, in accordance with certain aspects of the present disclosure.

In certain wireless communication networks (e.g., such as a 5G NR network illustrated in FIG. 1), a user equipment may communicate with the network via multiple transmission reception points (TRPs) (e.g., a first TRP and a second TRP) on one or more transmission beams associated with each of the TRPs. For example, as illustrated in FIG. 8A the UE may communicate with a first TRP 802 on one or more transmission beams 804 corresponding to the TRP 802 and with a second TRP 806 on one or more transmission beams 808 corresponding to the TRP 806. In some cases, the TRP 802 and the TRP 806 may correspond with the TRP 208 illustrated in FIG. 2.

In some cases, a gNB may determine a downlink (DL) transmission (TX) beam combination for the UE to use to communicate with the TRPs based on certain criteria, such as feedback reports from the UE. The DL TX beam combination may comprise a pair of transmission beams, including at least one transmission beam corresponding to the first TRP and a second transmission beam corresponding to the second TRP.

In some cases, the determination of which transmission beams to include in the beam combination may be based on one or more criteria, such as a combined throughput or a combined reference signal received power (RSRP) associated with the pair of transmission beams, which may be determined based on feedback reports (e.g., reference signal received power (RSRP) reports) generated by the UE as part of a beam refinement procedure (P1, P2, P3) as described above.

For example, in some cases, the gNB may determine a combination of transmission beams corresponding to the first TRP and the second TRP that provide a good (e.g., above a threshold) throughput or RSRP. That is, for example, in some cases, the gNB may determine that Beam #1 of the first TRP 802 and Beam #3 of the second TRP 806, when combined, provide a good throughput and/or RSRP. In such a case, the gNB may select Beam #1 of the first TRP 802 and Beam #3 of the second TRP 806 and include them as a DL TX beam combination. The gNB may then transmit an indication of the DL TX beam combination to the UE. The UE may then use the DL TX beam combination to communicate with the first TRP 802 and the second TRP 806.

However, certain issues exist with having the gNB solely determine the beam combination. For example, in some cases, a gNB may not be able to discover/detect a new TRP that is within range of the UE. In this case, the gNB would not be able to determine a beam combination using this new TRP. For example, with reference to FIG. 8A, in some cases a gNB may detect TRP 802 but not be aware of TRP 806 that is within range of the UE. Thus, the gNB would not be able to consider beams (e.g., DL transmission beam 808 or DL reception beam 814) corresponding to the TRP 806 when determining the beam combination.

Figure 8B:
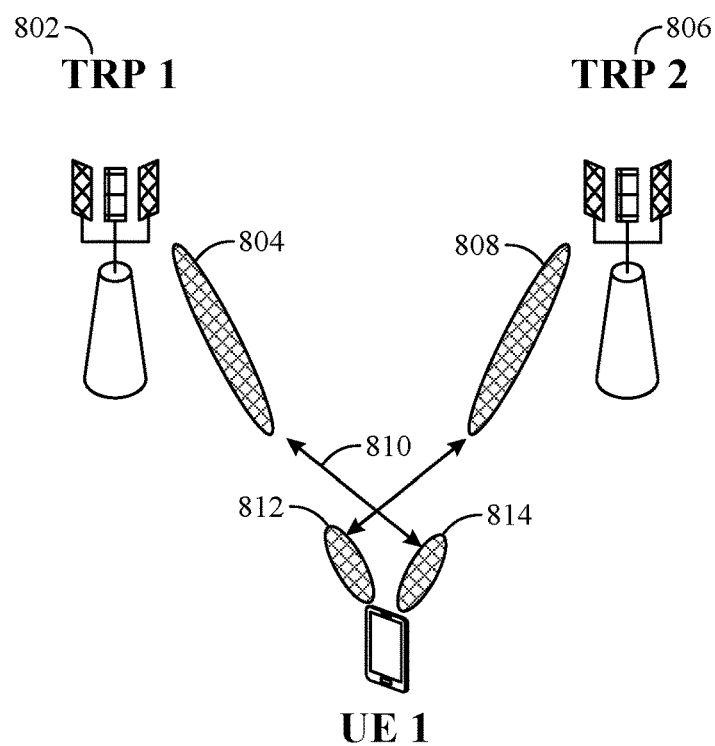
FIG. 8B illustrates an exemplary scenario of high cross-beam interference between transmission and reception beams, in accordance with certain aspects of the present disclosure.

In such a case, the gNB may have no knowledge of the existence of cross-beam (inter-beam) interference between beams used by the UE to communicate with TRPs, leading to inefficient communication. For example, in some cases, as illustrated in FIG. 8B, there may be high cross-beam interference 810 between DL transmission beam 804 corresponding to the TRP 802 and transmission beam 808 corresponding to TRP 806. However, the gNB may not know of the existence of the cross-beam interference 810 between transmission beam 804 and DL reception beam 814. Similarly, there may also be high cross-beam interference between DL transmission beam 808 and DL reception beam 812 that the gNB would not know about. Thus, since the gNB may not know about the cross-beam interference experienced at the UE the gNB may configure the UE with a beam combination that results in high-cross beam interference.

Thus, aspects of the present disclosure provide techniques to help alleviate these issues. For example, techniques presented herein provide techniques whereby the UE determines (or assists the gNB in determining) the beam combination to be used for communicating with the multiple TRPs. This may allow new TRPs that are detected by the UE, but not detected by the gNB, to be taken into account when determining the beam combination. Additionally, the techniques presented herein may allow for a UE to indicate to the gNB certain beam combinations that result in cross-beam interference. The gNB may take the indication of the beam combinations that result in cross-beam interference into account when configuring the UE with a beam combination to use for communication with the multiple TRPs.

Figure 9A:
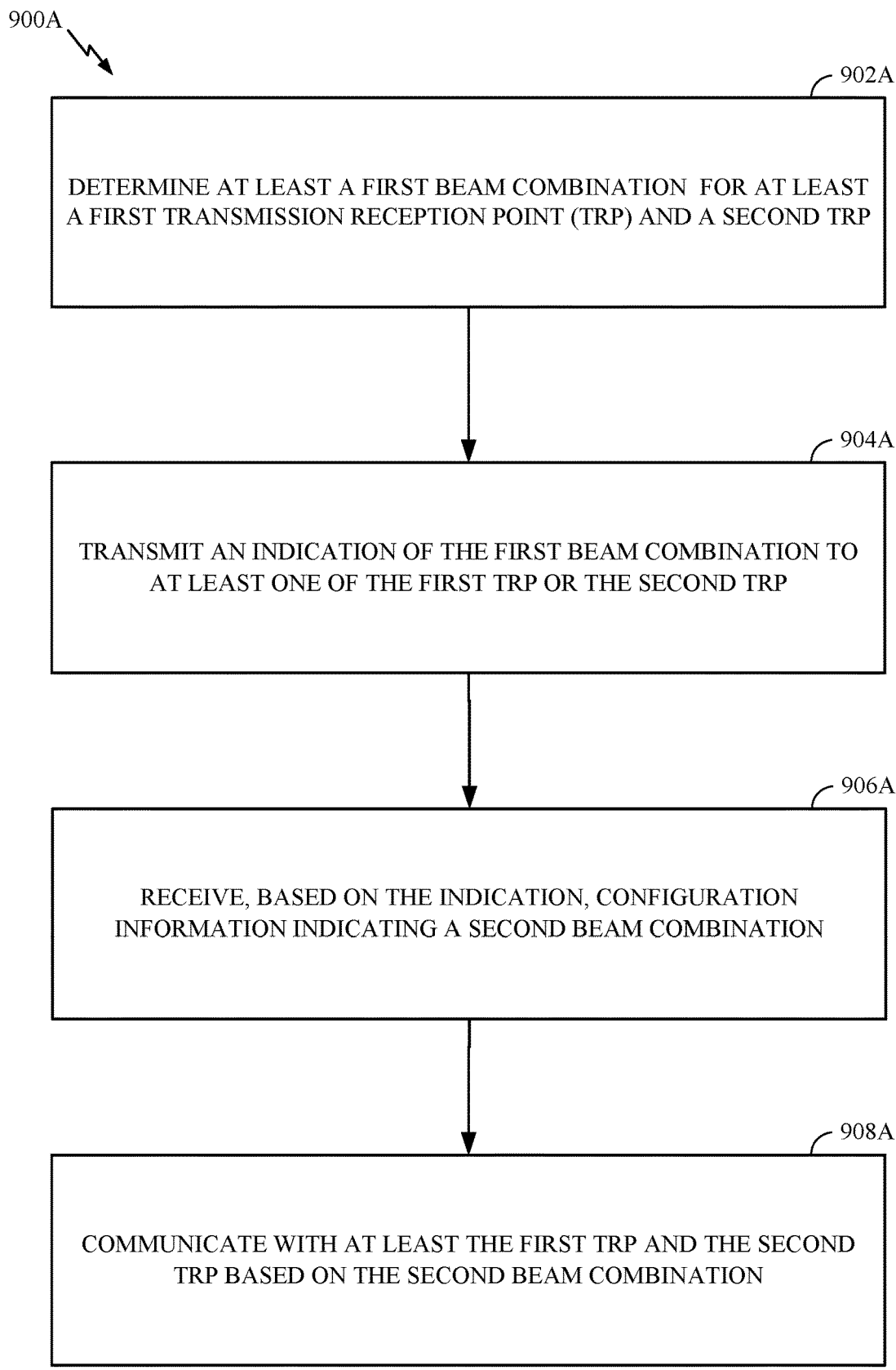
FIG. 9A illustrates example operations for wireless communications by a user equipment, in accordance with certain aspects of the present disclosure.

FIG. 9A illustrates example operations 900A for wireless communications in a network by a user equipment, for example, assisting in determining a beam combination for use in communicating with one or more TRPs.

According to aspects, the UE may include one or more components as illustrated in FIG. 4 which may be configured to perform the operations described herein. For example, the antenna 452, demodulator/modulator 454, controller/processor 480, and/or memory 482 as illustrated in FIG. 4 may perform the operations described herein.

Operations 900A begin at 902A by determining at least a first beam combination for at least a first transmission reception point (TRP) and a second TRP.

At 904A, the UE transmits an indication of the first beam combination to at least one of the first TRP or the second TRP.

At 906A, the UE receives, based on the indication, configuration information indicating a second beam combination.

At 908A, the UE communicates with at least the first TRP and the second TRP based on the second beam combination.

Figure 9B:
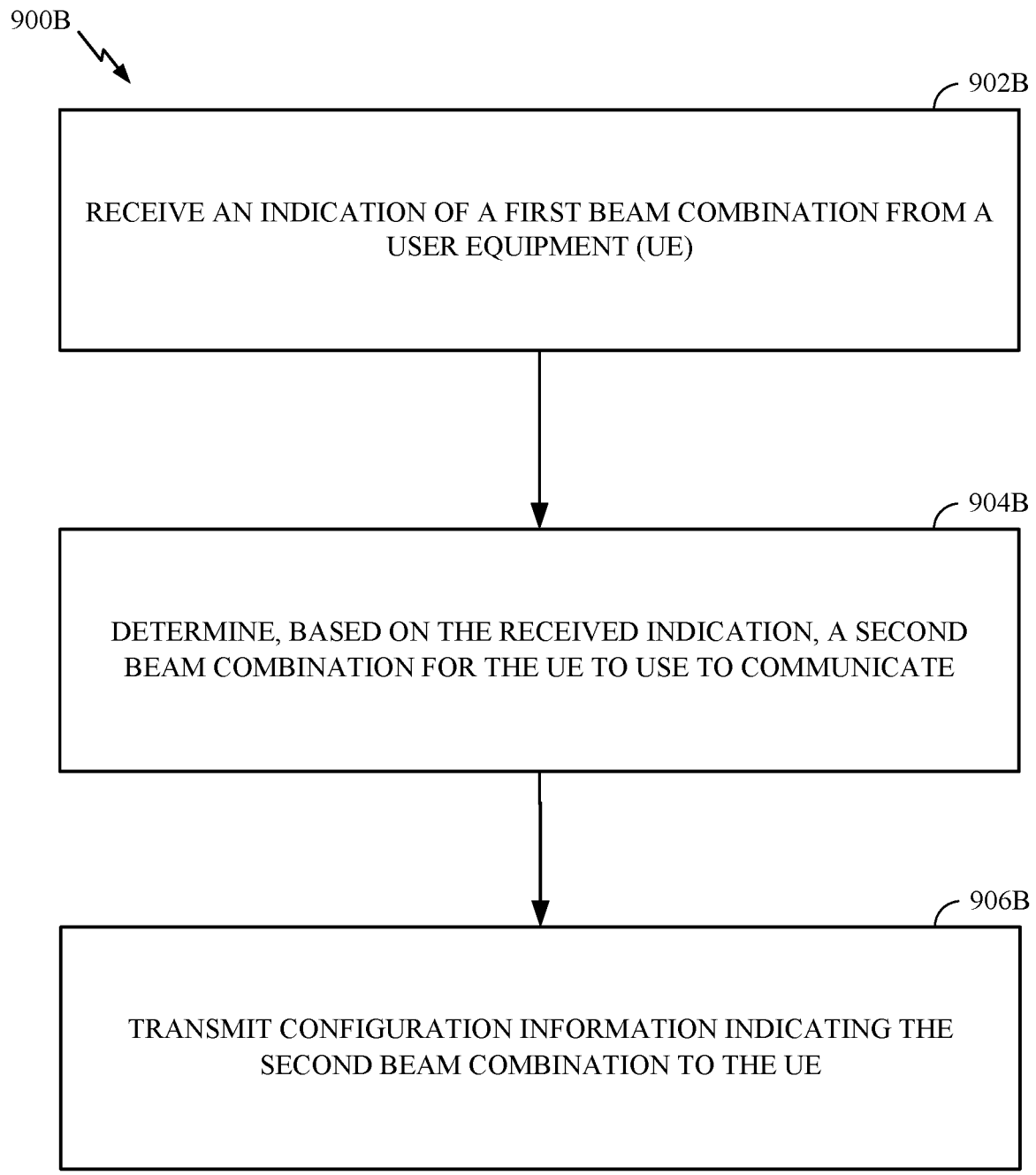
FIG. 9B illustrates example operations for wireless communications by a base station, in accordance with certain aspects of the present disclosure.

FIG. 9B illustrates example operations 900B for wireless communications in a network by a base station, such as a gNB, for determining a beam combination. In some cases, operations 900B may be considered complementary to operations 900A performed by the UE.

According to aspects, the BS may include one or more components as illustrated in FIG. 4 which may be configured to perform the operations described herein. For example, the antenna 434, demodulator/modulator 432, controller/processor 440, and/or memory 442 as illustrated in FIG. 4 may perform the operations described herein.

Operations 900B begin at 902B by receiving an indication of a first beam combination from a user equipment (UE).

At 904B, the BS determines, based on the received indication, a second beam combination for the UE to use to communicate.

At 906B, the BS transmits configuration information indicating the second beam combination to the UE.

As noted above, the UE may determine at least a first beam combination for at least a first TRP (e.g., TRP 802) and a second TRP (e.g., TRP 806). In some cases, the UE may determine the beam combination by performing one or more beam refinement procedures (e.g., P1, P2, P3, described above), which may involve performing measurements on one or more sets of reference signals transmitted from the first TRP and the second TRP.

For example, in some cases, the UE may perform one or more first measurements on a first set of reference signals transmitted by the first TRP via a first set of transmission beams and may perform one or more second measurements on a second set of reference signals transmitted by the second TRP via a second set of transmission beams.

For example, in some cases, the first TRP may transmit one or more reference signals on transmission beams in a first set of transmission beams and the second TRP may transmit one or more reference signals on transmission beams in a second set of transmission beams. In this case, the UE may perform measurements on the one or more reference signals transmitted on the first set of transmission beams (e.g., corresponding to the first TRP) and may also perform measurements on the one or more reference signals transmitted on the second set of transmission beams (e.g., corresponding to the second TRP).

In some cases, the reference signals may comprise channel state information reference signals (CSI-RS) and the measurements may comprise reference signal receive power (RSRP) measurements.

According to aspects, based on the measurements, the UE may determine/select a recommended beam combination to use for communicating with the first TRP and the second TRP. For example, the recommended beam combination may include a pair of transmission beams, one or more for communicating with the first TRP (T1B1) and one or more for communicating with the second TRP (T2B2), that result in a combined RSRP at or above a threshold (e.g., RSRP T1B1+RSRP T2B2≥threshold). The UE may then provide an indication to the gNB of the recommended beam combination, including the pair of transmission beams for the first TRP and the second TRP. Based on the indication, the UE may receive configuration information from the gNB that configures the UE with a second beam combination (e.g., which may or may not be the same as the recommended beam combination). The UE may then communicate with the first TRP and the second TRP based on the second beam combination.

Figure 10A:
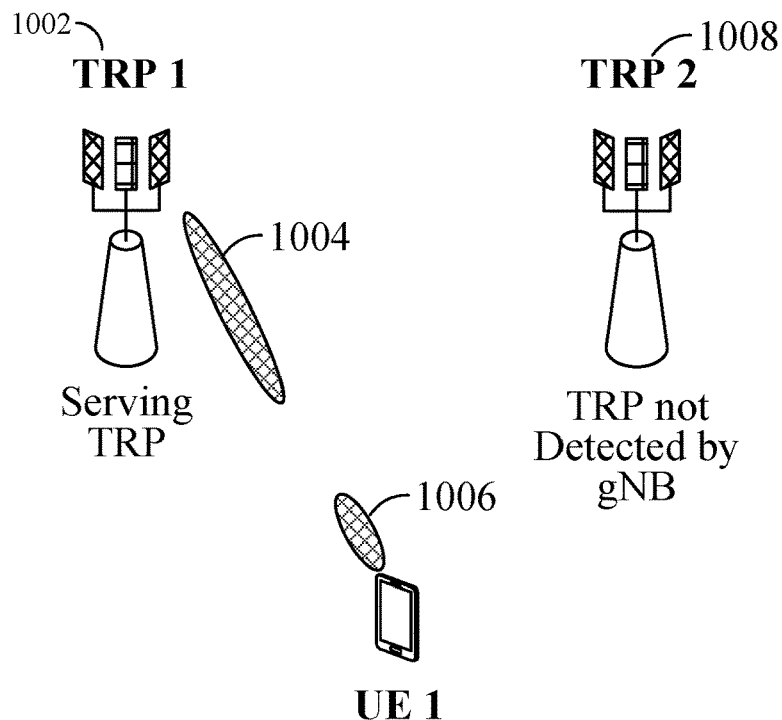
FIG. 10A illustrates an exemplary scenario of a first transmission reception point not detecting a second transmission reception point, in accordance with certain aspects of the present disclosure.
Figure 10B:
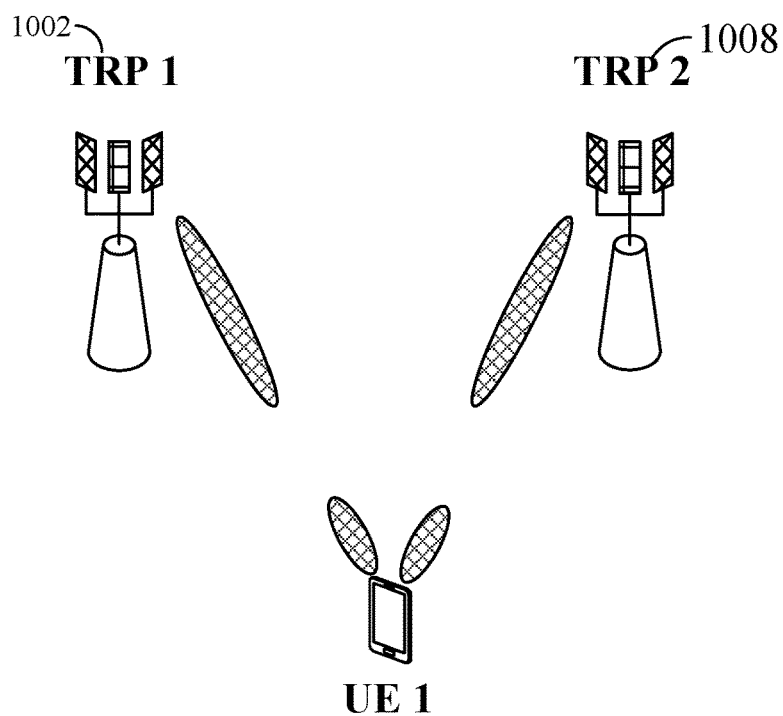
FIG. 10B illustrates an exemplary scenario of a user equipment detecting a beam combination for two transmission reception points, in accordance with certain aspects of the present disclosure.

In this way, as noted above, by allowing the UE to assist in determining a beam combination, the UE may be able to determine beam combinations for TRPs that are detected by the UE but not detected by the gNB. For example, as illustrated in FIG. 10A, in some cases, the UE may communicate with the gNB using a serving TRP 1002 on one or more transmission beams 1004 and one or more reception beams 1006. However, as illustrated in FIG. 10A, the UE may also detect there is a second TRP 1008 that the UE may communicate with and that may not be detected by the gNB. Thus, as illustrated in FIG. 10B, the UE may use the techniques described above to determine a beam combination for TRP 1002 and TRP 1008 and may feedback an indication of this beam combination to the gNB, enabling the gNB to configure the UE with a beam combination to communicate with TRP 1002 and TRP 1008 that would otherwise not be possible since the gNB could not detect TRP 1008 as a neighboring cell of UE.

In some cases, the UE may determine a beam combination that is not recommended. For example, in some cases, the UE may detect that a particular beam combination for a first TRP and a second TRP may experience high cross-beam interference and may provide an indication to the gNB indicating that the UE does not recommend this beam combination. High-cross beam interference between transmission beams may not be desirable and can lead to issues with communication quality and increase power consumption at the UE by requiring the UE to perform more advanced interference cancellation techniques to overcome the cross-beam interference.

Figure 11:
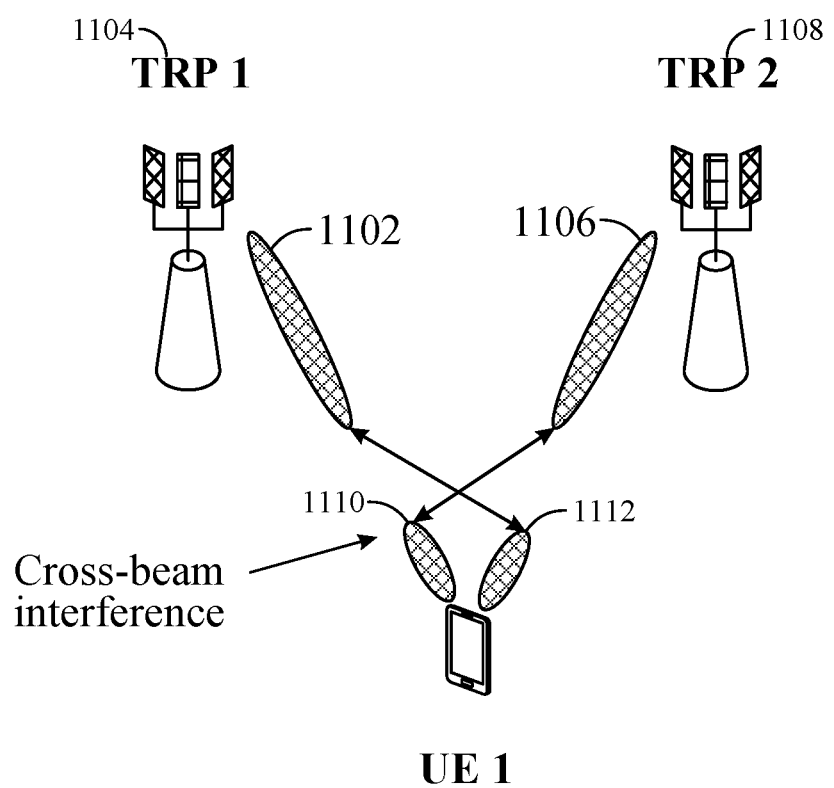
FIG. 11 illustrates an exemplary scenario of high cross-beam interference between transmission and reception beams, in accordance with certain aspects of the present disclosure.

For example, as illustrated in FIG. 11, in some cases, a first transmission beam 1102 corresponding to a first TRP 1104 may cause high cross-beam interference with a first reception beam 1112 corresponding to a second TRP 1108. Additionally, in some cases, a second transmission beam 1106 corresponding to TRP 1108 may cause high cross-beam interference with a second reception beam 1110 corresponding to TRP 1104. The UE may determine that the first transmission beam 1102 and the first reception beam 1112 (as well as the second transmission beam 1106 and the second reception beam 1110) cause high cross-beam interference at the UE (e.g., above a threshold) based on one or more measurements, such as RSRP measurements performed on CSI-RSs as described above.

For example, in some cases, when a combined RSRP for the first transmission beam 1102 and the second transmission beam 1106 (e.g., as a beam combination) is less than or equal to a threshold or when a cross-beam interference is greater than or equal to a threshold, the UE may determine that this beam combination (e.g., the combination of the first transmission beam 1102 and the second transmission beam 1106) is not recommended by the UE due to the cross-beam interference with reception beams at the UE (e.g., first reception beam 1112 and second reception beam 1110). In other words, when a combined RSRP for the first transmission beam 1102 and the second transmission beam 1106 is less than or equal to a threshold, the UE may determine that, for example, either the transmission beam 1102 and reception beam 1112 are producing cross-beam interference or the transmission beam 1106 and reception beam 1110 are producing cross-beam interference, causing to the combined RSRP for the first transmission beam 1102 and the second transmission beam 1106 being less than or equal to a threshold. Thus, in this case, the UE may determine that the beam combination of the first transmission beam 1102 and the second transmission beam 1106 is not recommended.

Additionally, in some cases, assuming that the signal to interference plus noise ratio (SINR) without cross beam interference is SINR1 and the SINR with cross beam interference is SINR 2, the UE may determine that the beam combination is not recommended if SINR1-SINR2 is larger than a threshold.

In response to determining the first transmission beam 1102 and the second transmission beam 1106 may experience high cross-beam interference, the UE may transmit an indication to the gNB indicating that the beam combination of the first transmission beam 1102 and the second transmission beam 1106 is not recommended. The gNB may use the indication when determining beam combination configuration information for the UE to use to communicate with the first TRP 1104 and the second TRP 1108. For example, when determining the beam combination configuration information, the gNB may exclude the non-recommended beam combination (e.g., the first transmission beam 1102 and the second transmission beam 1106) as indicated by the UE. In other words, the gNB may not configure the UE with the non-recommended beam combination.

According to aspects, in some cases, the non-recommended beam combination may include a pair of transmission beams that were previously configured by the gNB to be used at the UE or may include a pair of transmission beams that are initially reported by the UE (e.g., a pair of beams that were not configured by the gNB and that are not recommended by the UE).

In some cases, the UE may report the indication of the beam combination (e.g., recommended and/or not recommended) autonomously or the indication may be requested by the gNB. For example, in some cases, when reporting the indication autonomously, the UE may request an uplink (UL) grant via a scheduling request (SR). In response to the SR, the UE may receive an UL grant that includes resources for transmitting the indication. As noted, in other cases, the gNB may trigger the transmission of the indication. For example, in such a case, the gNB may transmit a trigger to the UE and, upon reception of the trigger, the UE may transmit the indication of the beam combination (e.g., whether it is a recommended beam combination or not-recommended beam combination).

According to aspects, in some cases, the UE may determine the beam combination for a first TRP (TRP1) and a second TRP (TRP2) jointly or in a time division multiplexing (TDM)-manner.

Figure 12:
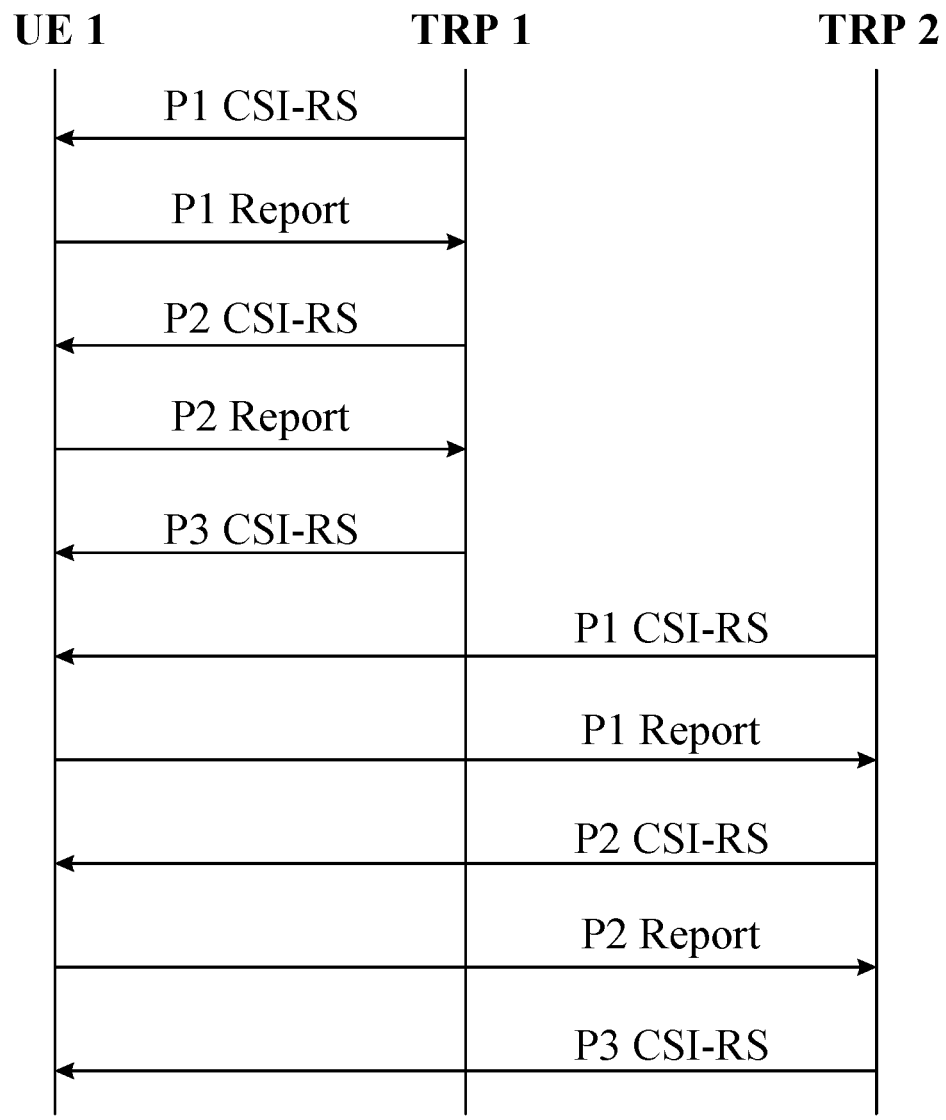
FIG. 12 illustrates an example call flow diagram for determining a beam combination at a user equipment, in accordance with certain aspects of the present disclosure.

For example, as illustrated in FIG. 12, the UE may determine the beam combination in a TDM manner by performing a P1, P2, P3 procedure (e.g., performing measurements on P1, P2, and P3 CSI-RSs) with TRP1 and transmitting P1 and P2 feedback reports to the gNB of TRP1 that indicate a best transmission beam for communicating with the first TRP. Thereafter, the UE may perform a P1, P2, P3 procedure with TRP2 and transmit P1 and P2 reports to the gNB of TRP2 that indicate a best transmission beam for communicating with the second TRP.

Figure 13:
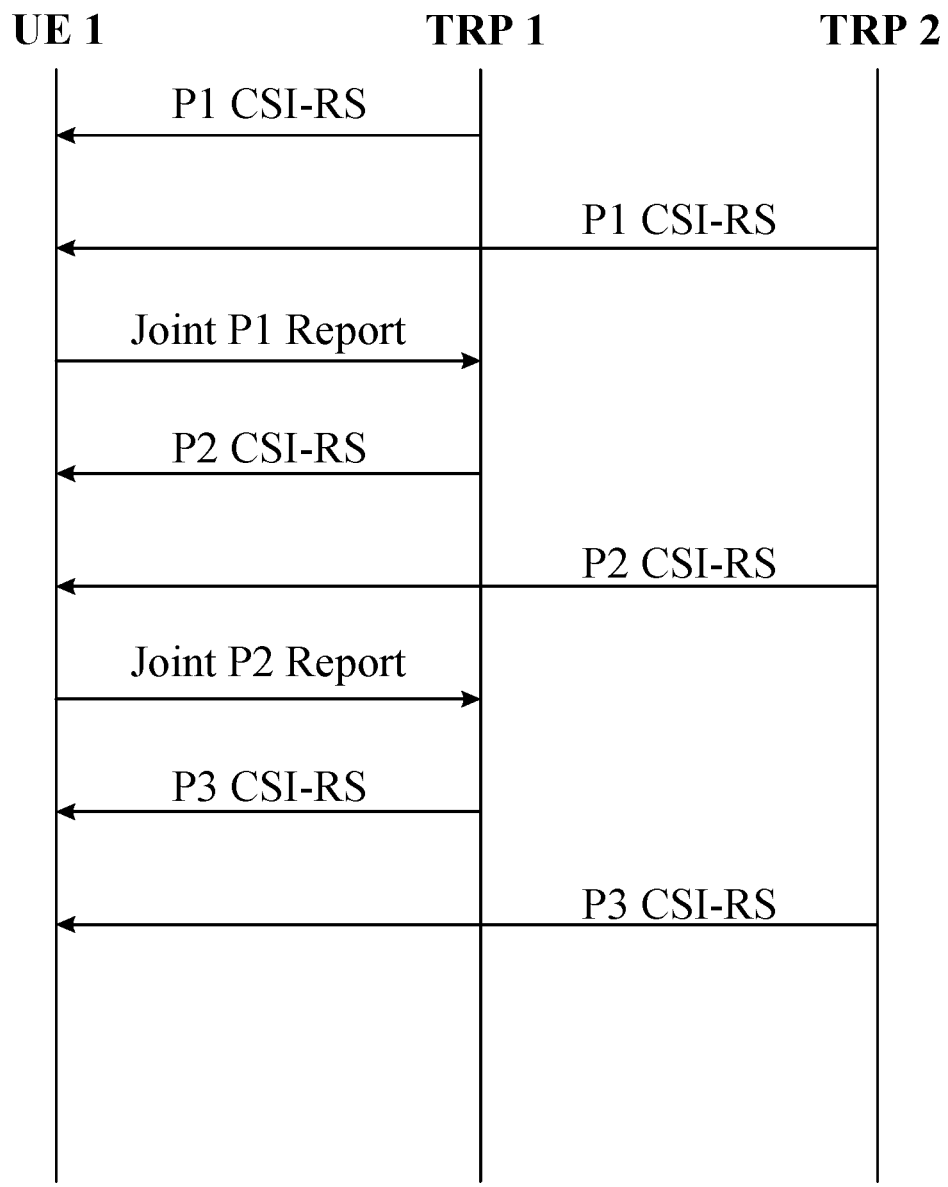
FIG. 13 illustrates an example call flow diagram for determining a beam combination at a user equipment, in accordance with certain aspects of the present disclosure.

In other cases, such as illustrated in FIG. 13, the UE may determine the beam combination jointly. For example, as illustrated, the UE may jointly perform a P1 procedure with TRP1 and TRP2 and send a joint P1 report to the gNB of TRP1. Thereafter, the UE may perform joint P2 and P3 procedures with TRP1 and TRP2, sending joint P2 reports to the gNB of TRP1. According to aspects, the joint P1 and P2 reports may indicate a beam combination for communicating with TRP1 and TRP2.

It should be noted that while aspects of the present disclosure provide techniques for a UE determining a beam combination, which is initially described as a DL TX beam combination, the techniques presented above apply equally to determining an uplink (UL) TX beam combination. For example, as described above, the UE may determine and report recommended UL TX beam combinations and/or not-recommended UL TX beam combinations, for example, using the techniques described above. Additionally, determining the UL TX beam combinations may be performed jointly or in a TDM-manner.

Figure 14:
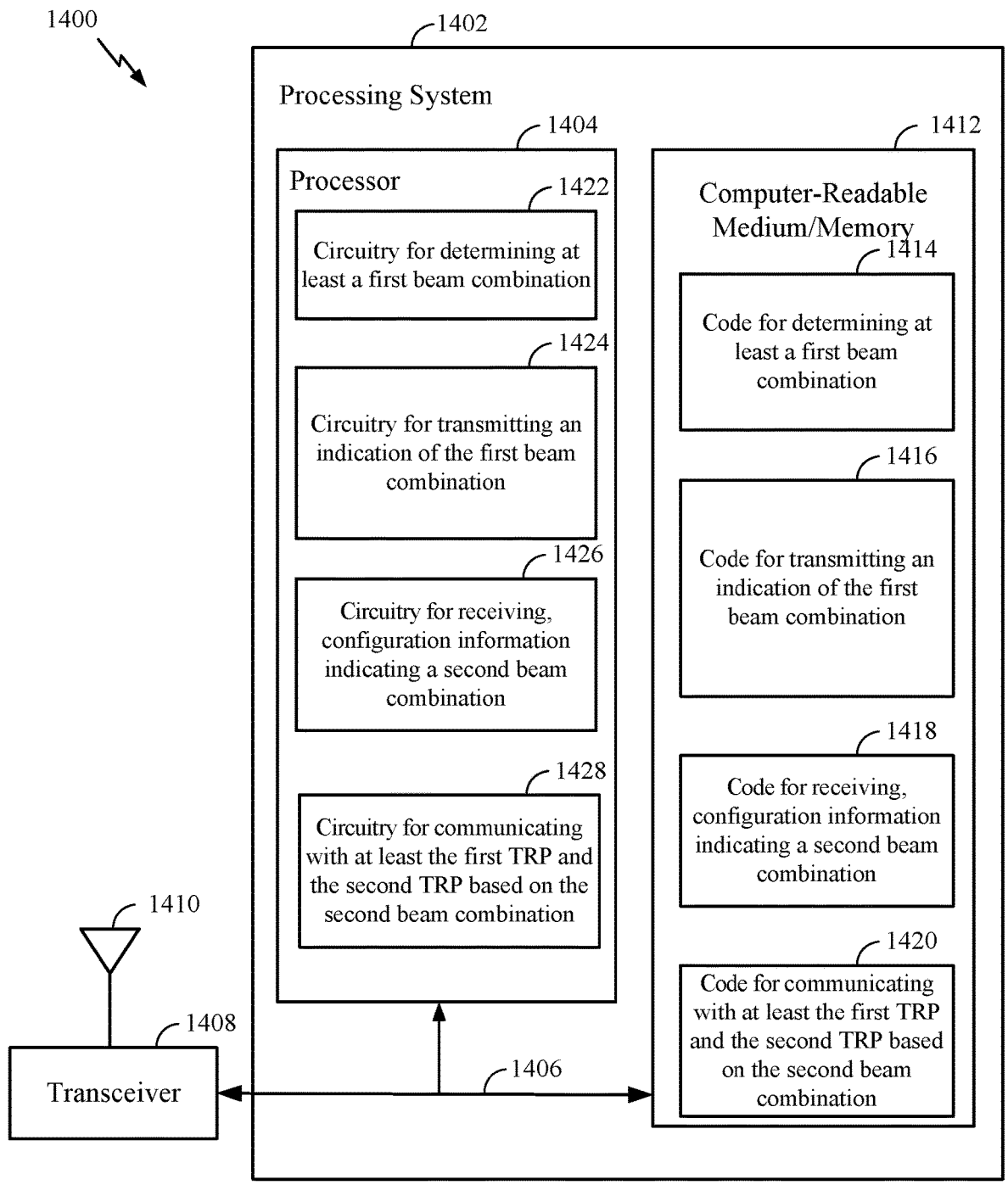
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 9A. The communications device 1400 includes a processing system 1402 coupled to a transceiver 1408. The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 9A, or other operations for performing the various techniques discussed herein for selecting a beam combination. In certain aspects, computer-readable medium/memory 1412 stores code 1414 for determining at least a first beam combination for at least a first transmission reception point (TRP) and a second TRP; code 1416 for transmitting an indication of the first beam combination to at least one of the first TRP or the second TRP; code 1418 for receiving, based on the indication, configuration information indicating a second beam combination; and code 1420 for communicating with at least the first TRP and the second TRP based on the second beam combination. In certain aspects, the processor 1404 includes circuitry configured to implement the code stored in the computer-readable medium/memory 1412. For example, the processor 1404 includes circuitry 1422 for determining at least a first beam combination for at least a first transmission reception point (TRP) and a second TRP; circuitry 1424 for transmitting an indication of the first beam combination to at least one of the first TRP or the second TRP; circuitry 1426 for receiving, based on the indication, configuration information indicating a second beam combination; and circuitry 1428 for communicating with at least the first TRP and the second TRP based on the second beam combination.

Figure 15:
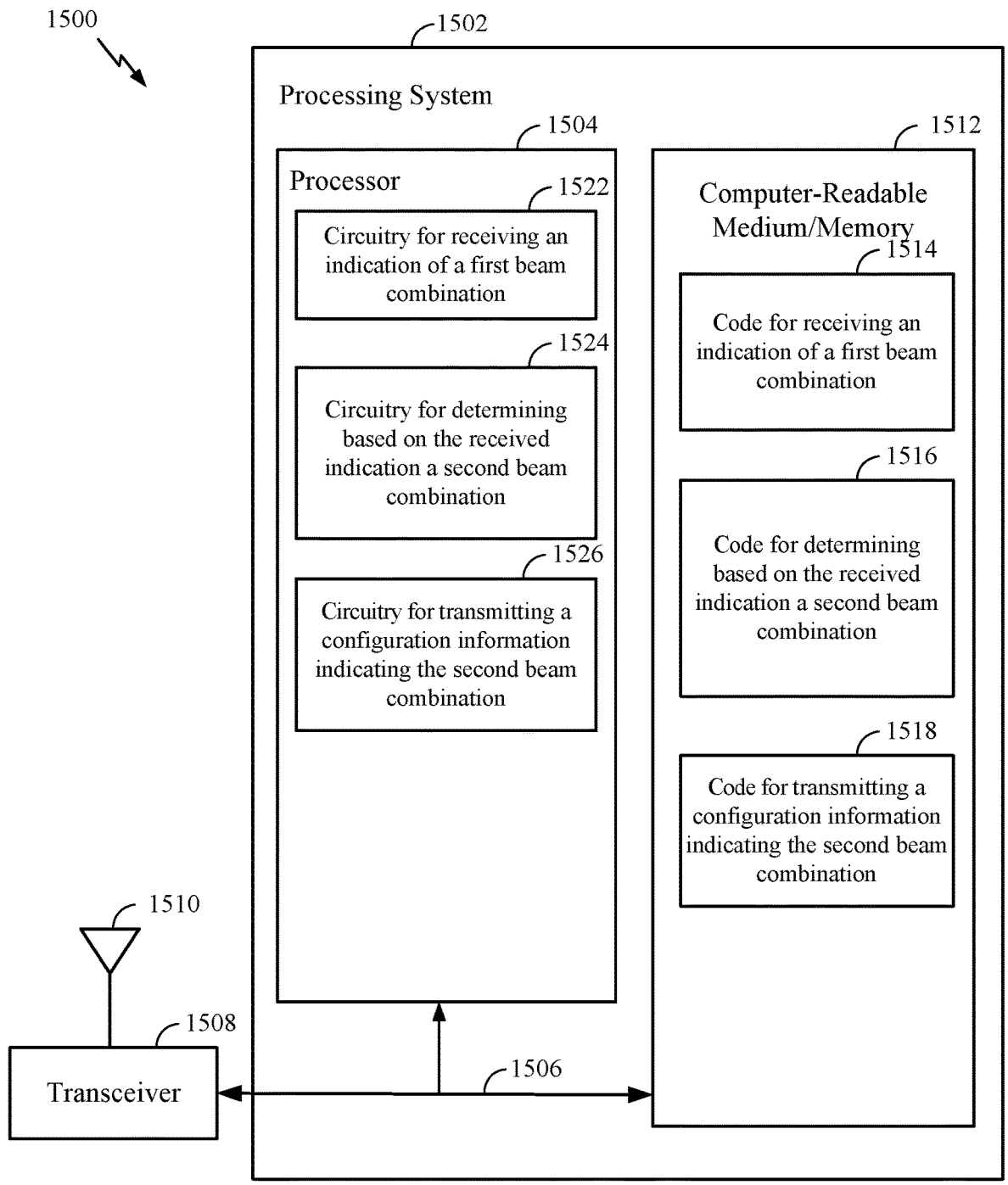
FIG. 15 illustrates a communications device that may include various components configured to perform operations for the techniques disclosed herein in accordance with aspects of the present disclosure.

FIG. 15 illustrates a communications device 1500 that may include various components (e.g., corresponding to means-plus-function components) configured to perform operations for the techniques disclosed herein, such as the operations illustrated in FIG. 9B. The communications device 1500 includes a processing system 1502 coupled to a transceiver 1508. The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 9B, or other operations for performing the various techniques discussed herein for selecting a beam combination. In certain aspects, computer-readable medium/memory 1512 stores code 1514 for receiving an indication of a first beam combination from a user equipment (UE); code 1516 for determining based on the received indication a second beam combination for the UE to use to communicate; and code 1518 for transmitting a configuration information indicating the second beam combination to the UE. In certain aspects, the processor 1504 includes circuitry configured to implement the code stored in the computer-readable medium/memory 1512. For example, the processor 1504 includes circuitry 1522 for receiving an indication of a first beam combination from a user equipment (UE); circuitry 1524 for determining based on the received indication a second beam combination for the UE to use to communicate; and circuitry 1526 for transmitting a configuration information indicating the second beam combination to the UE.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 9A-FIG. 9B, FIG. 12, and/or FIG. 13.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
    determining at least a first beam combination for at least a first transmission reception point (TRP) and a second TRP, wherein the first TRP or the second TRP is detected by the UE;
    transmitting an indication of the first beam combination to at least one of the first TRP or the second TRP, wherein the indication indicates the first beam combination is not recommended, the recommendation associated with a cross-beam interference;
    receiving, based on the indication, configuration information indicating a second beam combination; and
    communicating with at least the first TRP and the second TRP based on the second beam combination.

2. The method of claim 1, wherein the first beam combination and the second beam combination are the same.

3. The method of claim 1, wherein determining the first beam combination comprises:
    performing first measurements on a first set of reference signals transmitted by the first TRP via a first set of transmission beams; and
    performing second measurements on a second set of reference signals transmitted by the second TRP via a second set of transmission beams.

4. The method of claim 3, wherein the first set of reference signals transmitted by the first TRP and the second set of reference signals transmitted by the second TRP comprise channel state information reference signals (CSI-RSs).

5. The method of claim 3, wherein the first measurements and the second measurements comprise reference signal received power (RSRP) measurements.

6. The method of claim 3, wherein:
    determining the first beam combination comprises selecting, based on the first measurements and the second measurements, a first transmission beam from the first set of transmission beams and a second transmission beam from the second set of transmission beams; and
    the first beam combination includes the first transmission beam and the second transmission beam.

7. The method of claim 6, wherein the transmitted indication indicates that the first beam combination is recommended by the UE.

8. The method of claim 6, wherein first measurements and the second measurements are performed one of jointly or separately.

9. The method of claim 6, wherein the first transmission beam and the second transmission beam are selected based on a beam measurement being greater than a threshold.

10. The method of claim 9, wherein the beam measurement includes a combined reference signal received power (RSRP) for the first transmission beam and the second transmission beam.

11. The method of claim 9, wherein the beam measurement includes a cross-beam interference associated with the first transmission beam and the second transmission beam.

12. The method of claim 11, wherein:
    transmitting the indication comprises:
        requesting an uplink grant via a scheduling request (SR);
        receiving the requested uplink grant; and
        transmitting the indication based on the received uplink grant; or
    transmitting the indication comprises:
        receiving a request for the first beam combination; and
        transmitting the indication in response to the received request.

13. The method of claim 1, wherein first beam combination comprises one of downlink transmission beams or uplink transmission beams.

14. A method for wireless communication by a base station, comprising:
    receiving an indication of a first beam combination from a user equipment (UE), wherein the first beam combination is based on measurements of a set of reference signals transmitted by a first TRP or a second TRP detected by the UE, wherein the indication indicates the first beam combination is not recommended, the recommendation associated with a cross-beam interference;
    determining, based on the received indication, a second beam combination for the UE to use to communicate; and
    transmitting configuration information indicating the second beam combination to the UE.

15. The method of claim 14, wherein the first beam combination and the second beam combination are the same.

16. The method of claim 14, wherein the first beam combination is based on:
   first measurements of a first set of reference signals transmitted by a first transmission reception point (TRP) via a first set of transmission beams; and
   second measurements of a second set of reference signals transmitted by a second TRP via a second set of transmission beams.

17. The method of claim 16, wherein the first set of reference signals transmitted by the first TRP and the second set of reference signals transmitted by the second TRP comprise channel state information reference signals (CSI-RSs).

18. The method of claim 16, wherein the first measurements and the second measurements comprise reference signal received power (RSRP) measurements.

19. The method of claim 16, wherein the first beam combination comprises, based on the first measurements and the second measurements, a first transmission beam selected from the first set of transmission beams and a second transmission beam selected from the second set of transmission beams.

20. The method of claim 19, wherein the received indication indicates that the first beam combination is recommended by the UE.

21. The method of claim 19, wherein the first transmission beam and the second transmission beam are selected based on a beam measurement being greater than a threshold.

22. The method of claim 21, wherein the beam measurement includes a combined reference signal received power (RSRP) for the first transmission beam and the second transmission beam.

23. The method of claim 21, wherein the beam measurement includes a cross-beam interference associated with the first transmission beam and the second transmission beam.

24. The method of claim 23, wherein receiving the indication comprises:
   receiving a scheduling request (RS) for an uplink grant;
   transmitting the requested uplink grant; and
   receiving the indication based on the transmitted uplink grant.

25. The method of claim 23, further comprising:
   transmitting a request for the first beam combination; and
   receiving the indication in response to the transmitted request.

26. The method of claim 14, wherein first beam combination comprises one of downlink transmission beams or uplink transmission beams.

27. An apparatus for wireless communication by a user equipment (UE), comprising:
   at least one processor configured to:
   determine at least a first beam combination for at least a first transmission reception point (TRP) and a second TRP, wherein the first TRP or the second TRP is detected by the UE;
   transmit an indication of the first beam combination to at least one of the first TRP or the second TRP, wherein the indication indicates the first beam combination is not recommended, the recommendation associated with a cross-beam interference;
   receive, based on the indication, configuration information indicating a second beam combination; and
   communicate with at least the first TRP and the second TRP based on the second beam combination; and
   a memory coupled with the at least one processor.

28. An apparatus for wireless communication by a base station (BS), comprising:
   at least one processor configured to:
   receive an indication of a first beam combination from a user equipment (UE), wherein the first beam combination is based on measurements of a set of reference signals transmitted by a first TRP or a second TRP detected by the UE, wherein the indication indicates the first beam combination is not recommended, the recommendation associated with a cross-beam interference;
   determine based on the received indication a second beam combination for the UE to use to communicate; and
   transmit a configuration information indicating the second beam combination to the UE, and a memory coupled with the at least one processor.

* * * * *